United States Patent

[11] 3,565,393

| | | | |
|---|---|---|---|
| [72] | Inventor | William John Courtney Trythall | |
| | | 6 Oakville Mansions, Devonshire Road, Southampton, England | |
| [21] | Appl. No. | 768,996 | |
| [22] | Filed | Dec. 16, 1968 | |
| [45] | Patented | Feb. 23, 1971 | |
| [32] | Priority | Oct. 4, 1967 | |
| [33] | | Great Britain | |
| [31] | | 45124 | |

[54] BLADE VALVES
5 Claims, 4 Drawing Figs.

[52] U.S. Cl. .................................................. 251/712, 251/326, 251/62, 92/177
[51] Int. Cl. .................................................. F16k 3/20
[50] Field of Search .................................................. 254/172, 175, 326, 62; 92/177; 251/63.5

[56] References Cited
UNITED STATES PATENTS
1,868,147  7/1932  Kruse ........................... 251/172

| 2,771,094 | 11/1956 | Bailey et al. .................. | 251/62X |
| 2,842,283 | 7/1958 | Smith ........................... | 251/326X |
| 3,081,974 | 3/1963 | Traut ............................ | 251/175X |
| 3,180,236 | 4/1965 | Beckett ........................ | 92/177X |

FOREIGN PATENTS
1,251,449  12/1960  France ........................ 251/172

*Primary Examiner*—Arnold Rosenthal
*Attorney*—Webster B. Harpman

ABSTRACT: A flat blade that is supported in cantilever fashion as it moves across a flow path to close said flow path, the flow path having resilient sealing means that can be expanded into contact with the two side edges of the blade after the blade has been moved to its closure setting. There is also resilient sealing means that can be expanded into contact with the leading edge of the blade after the blade has been moved to its closure setting. The blade is supported in cantilever fashion at one end by providing said end of the blade with a plurality of pistons slidable in a cylinder.

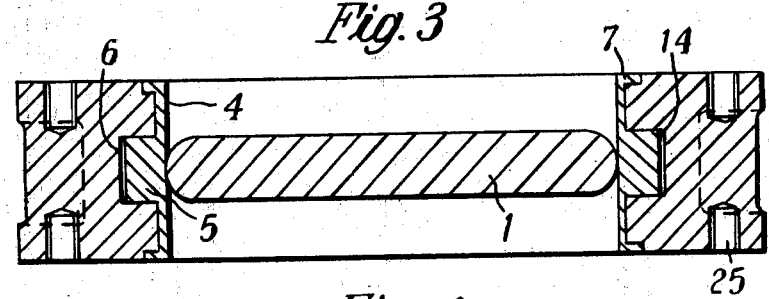
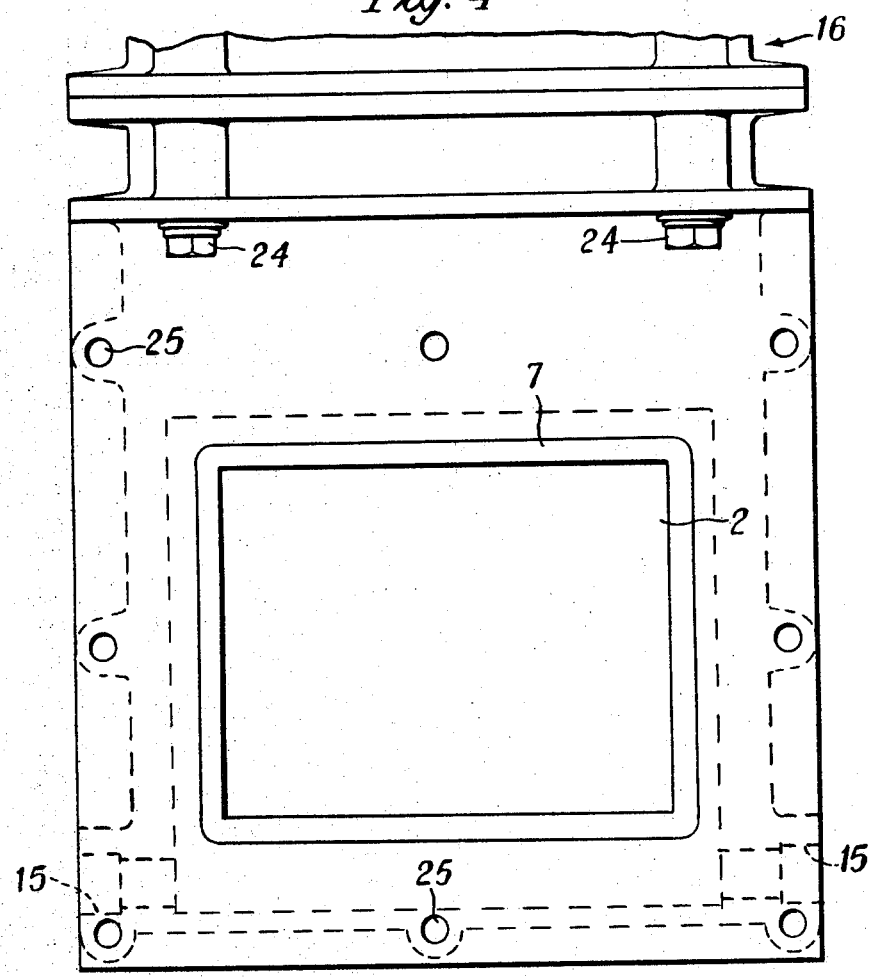

3,565,393

BLADE VALVES

BACKGROUND OF THE INVENTION

1. Field of the Invention

This invention relates to blade valves and has as its object the provision of a blade valve that is suitable for use in controlling the flow of solids such as granular or powdery material.

2. Description of the Prior Art

There is a growing tendency in industry to convey granular or powdery material by compressed air to and through the various plant that is used to handle the material and should a blade valve in a flow path fail to close effectively, there is the danger that a compressed air source, when brought into operation, may not effectively convey or disperse the granular or powdery material in the required manner.

Prior blade valves generally comprise a flat blade that has its two oppositely disposed longitudinal edges slidable in grooves that support the blade as it moves to and fro across the flow path. Since these grooves lie in the flow path that the blade is required to close, they tend to become clogged with any material that is present in the flow path and this clogging can prevent the blade from being moved to its closure setting.

The invention avoids the use of grooves in the material flow path as a means for supporting the flat blade as it slides to and fro across the material flow path and provides means whereby a sealing relationship between said flowpath and the longitudinal edges of the blade is not established until after the blade has been moved to its closure setting.

SUMMARY OF THE INVENTION

The blade valve disclosed herein comprises a flat blade that is supported at one end by pistons sliding in a cylinder. The bore in which the pistons slide is of rectangular form and the pistons therein are of a corresponding cross-sectional shape. This piston and cylinder arrangement gives portional rigidity to the flat blade to ensure that it is rigidly maintained in a plane normal to the direction of flow of material through the flow path that it must be capable of closing. By arranging the blade to be moved in a cantilevered fashion across the flow path and thus avoiding the conventional grooves in which the side edges of such blades are normally housed, there is no possibility that such grooves will become choked or otherwise blocked with the material in the flow path. With such an arrangement, moreover, the blade itself can act as the piston rod to the pistons since the rectangular shaped pistons may have their major sides of a length greater than the breadth of the flat blade and may have their minor sides of a length greater than the thickness of the flat blade.

The flow path has resilient means that can be expanded into a sealing relationship with the two side edges of the blade after the blade has been moved to its closure setting. The flow path also includes resilient means that can be expanded into contact with the leading edge of the blade after the blade has been moved to its closure setting.

The expandable resilient material may have a central portion that extends into recesses formed in a housing defining the material flow path but is not bonded to said recesses to leave a gap between the material and the recesses into which compressed gas or liquid can be forced to expand the resilient material against the blade, the material being bonded to the housing along areas on each side of said recesses. Alternatively the resilient means may have a bore therein to which said compressed gas or liquid may be applied to cause said resilient means to expand against the flat blade.

The blade extends through further sealing means before entering the aforesaid cylinder, the further sealing means being also expandable into sealing relationship with the blade when the blade has been moved to its closure setting.

DESCRIPTION OF THE DRAWINGS

FIG. 3 is a cross section through FIG. 1 taken along the line A–A in the flow path for the material.

FIG. 4 is a side view of FIG. 1 with part of FIG. 2 superimposed thereon with the line B–B of FIG. 2 superimposed on a further line A–A at the end of the housing illustrated in FIG. 1.

DESCRIPTION OF THE PREFERRED EMBODIMENT

Figure 1:
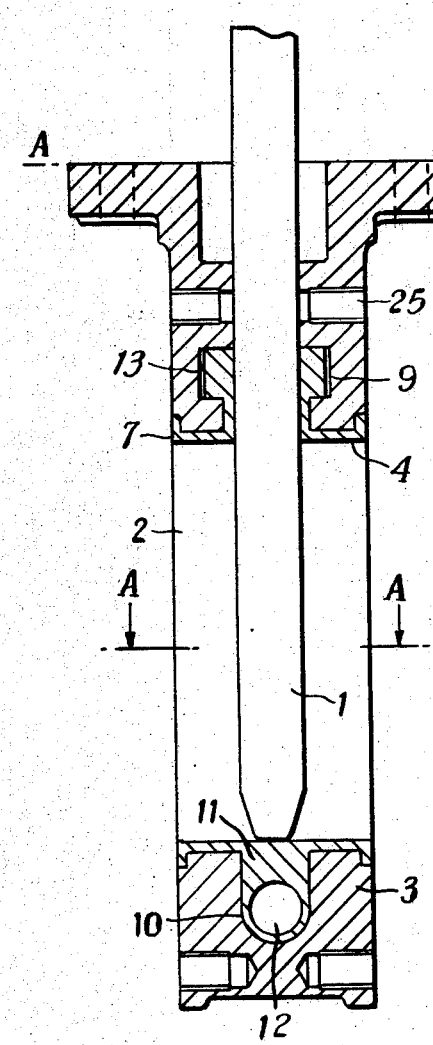
FIG. 1 is a cross-sectional side elevation through the valve housing and showing the blade closing the flow path through the housing.

As shown in the drawings, the valve comprises a flat blade 1 that is of rectangular form and that is capable of being moved across a rectangular-shaped flow path 2 formed in a rectangular housing 3. The housing 3 is formed with a flange 3A at its upper end whereby it can be secured to a piston housing described hereinafter.

The flow path 2 is lined with a moulding resilient material 4. The resilient material 4 is moulded directly onto the body of the housing 3. As shown in FIG. 3 the lining 4 is formed with a central portion 5 that extends into a recess 6 in each of the two sidewalls of the housing 3. The lining 4 also extends in the form of an external lip 7 along the outer side faces of the housing 3. The lining 4 is bonded directly to the housing 3 along the whole of the area along which it contacts the housing 3 except for the inner face of the central portion 5. In this manner there is provided a nonbonded area into which compressed gas or liquid can be forced to produce a gap 14 between the resilient lining 4 and the housing 3 in a manner causing the resilient material to be expanded against the flat blade 1.

Referring now to FIG. 1 it will be seen that the resilient moulding against which the leading edge of the blade 1 can abut is formed with a central portion 11 that extends into a substantially U-shaped recess 10 in the housing 3. That part of the moulding 4 that contains this central portion 11 is moulded directly along its whole length to the rectangular housing 3 and is provided, as above, with external lips 7 that are also bonded to the housing 3 by being moulded directly thereto. The central part 10 is formed with a bore 12. This bore 12 may be formed by housing a rod in the recess 10 whilst the resilient member 4 is being moulded therein and then withdrawing the rod at some subsequent stage.

As shown in FIG. 1 the blade 1 is slidable through one end of the housing 3 and this end is formed with a reentrant portion 9 into which the resilient material 4 is moulded in such a fashion that the material 4 is bonded to all of the surfaces of the reentrant portion 9 except for those two faces of the reentrant portion 9 that face the first blade 1. In this manner a compressed gas or liquid can be fed between the resilient material 4 and those faces of the reentrant portion 9 that face the blade 1 so as to produce a gap 13 therebetween in a manner compressing the resilient material 4 against the blade 1. The resilient material 4 is also bonded against that face of the housing 3 that defines the flow path 2, and is also provided with lips 7 as already described.

Referring now to FIG. 4 it will be seen that the housing 3 is provided with threaded bores 15 that lead into the bore 12 in the resilient material 4. The threaded bore 15 is used to accommodate suitable coupling member whereby a compressed gas or liquid can be supplied to the bore 12 and the gap 14. Suitable flow paths may be provided to convey this compressed gas or liquid to the gap 13; or a separate supply source to the gap 15 may be provided.

Those areas of the housing 3 to which the resilient material 4 is not bonded when moulded in position may be pretreated with any suitable material for causing the resilient material 4 to resist bending. The areas to which the resilient material 4 is not bonded may be pretreated with silicone.

Figure 2:
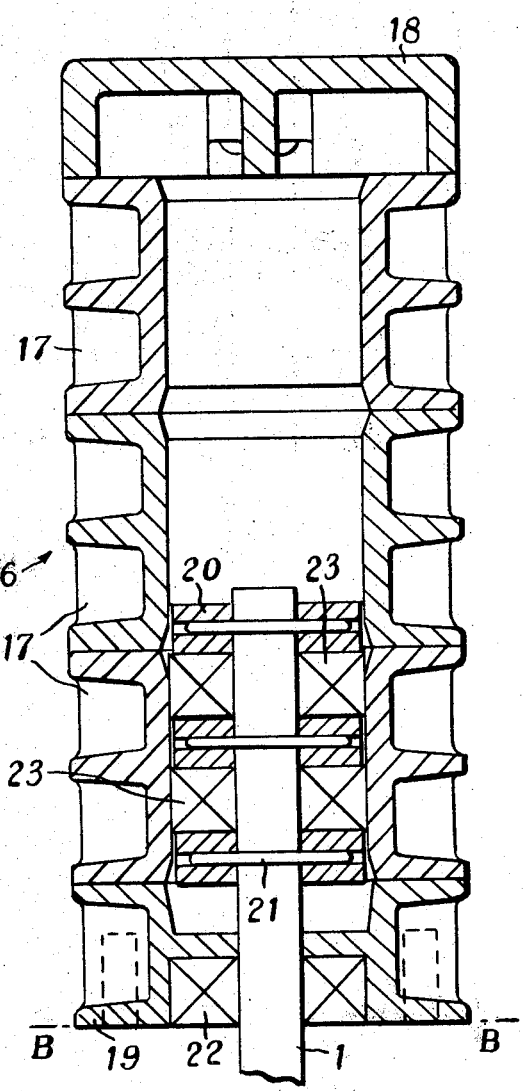
FIG. 2 is a cross-sectional elevation of a piston housing into which the blade extends.

Referring now to FIG. 2 it will be seen that the blade 1 is provided at its upper end with a plurality of pistons 20, each of these pistons being of rectangular form. The pistons 20 are secured to the blade 1 by one or more pins 21. Between the pistons 20 are seals 23 that are in engagement with the inner surface of the piston housing 16.

To facilitate construction the piston housing 16 is composed of a plurality of separate sections 17 that are coupled in end-to-end arrangement in any suitable manner.

At its lower end the piston housing 16 is provided with a lower section 19 having a transversely extending face through which the blade 1 extends. Below this transverse face is a sealing member 22. The lower section 19 is provided with threaded bores so that when the section 19 is mounted on the flange 3A of the rectangular housing 3, bolts 24, FIG. 4, may be passed through the flange 3A and into the threaded bores in the lower section 19 to bolt the piston housing 16 on to the flange 3A. At its upper end the piston housing 16 is provided with a top cap 18 to which suitable connections are made for supplying a compressed gas or liquid to the volume above the pistons 20 to cause the blade to move across the flow path 2 in a manner causing the blade to close said flow path. It will be noted from FIG. 2 that the blade 1 is supported in a cantilever fashion by the pistons 20 in the piston housing 16 and that the blade 1 is free from any support along its two side edges as it moves across the flow path. In this manner there are no grooves to guide said two side edges of the blade 1 and thus no possibility that such grooves will become clogged or jammed with the material in the flow path.

To cause the blade 1 to retract from the flow path 2 a suitable connection, not shown, is provided in section 19 of the piston housing 16 so as to enable a supply of compressed gas or liquid to be fed to the volume below the lowermost piston 20.

The two opposite faces of the rectangular housing 3 are provided with a plurality of threaded bores 25 whereby the end flanges of pipe lines associated with the valve can be coupled to the housing 3.

The resilient material 4 may be of rubber and by moulding this rubber directly into the recesses and reentrant portions of the housing 3 there is no need to machine said recesses or reentrant portions. This is a feature that cuts the manufacturing costs. This method of bonding the resilient material 4 to the housing 3 also ensures a deadtight seal so that high-pressure fluid can, if desired, be supplied to the gaps 13 and 14 in place of compressed air which is normally used and limited to the 80—100 p.s.i. as is available in shop air lines.

It is a further feature of the present invention that as the resilient sealing material 4 extends around the whole inner face of the rectangular flow path 2 as well as in the form of lips 7 on the external faces of the rectangular housing 3, such resilient material 4 gives a corrosionproof lining to the interior of the valve.

To ensure that the resilient material 4 is expanded against the blade 1 after it has been moved to its closure setting there may be a pivot valve that permits the gaps 13 and 14 to be pressurized after the blade 1 has moved to its closure setting. The necessary delay can also be achieved by a mechanical or electrical timer and associated valve gear on a main control panel.

If desired, a conventional circular shaped piston and cylinder arrangement may be used to cause the blade 1 to move across the flow path 2, but the aforesaid rectangular shaped piston and cylinder arrangement is preferred, since it gives the blade 1 torsional rigidity and enables the valve with its piston and cylinder attachment to have an overall flat configuration.

Any suitable means may be used to cause the blade 1 to move in cantilever fashion across the flow path 2.

Although rubber has been quoted as being one example of the material from which the resilient moulding 4 may be made, it will be appreciated that this is by way of example only and that any other suitable material may be used.

Again, although the flow path 2 is represented in FIG. 4 as being of rectangular, but not necessarily square shape, it will be appreciated that the flow path 2 may, if desired, be of square form.

While only one embodiment of the present invention has been illustrated and described, it will be apparent to those skilled in the art that various changes and modifications may be made therein without departing from the spirit of the invention, and having thus described my invention:

I claim:

1. A valve comprising a housing having a rectangular-shaped flow path, a layer of resilient material lining said flow path, a rectangular blade movable in its own plane across said flow path to a closure setting within the flow path, the blade passing through the resilient material on one of the sides of said rectangular-shaped flow path, the lining on the remaining three sides of the rectangular-shaped flow path being expansible in the plane of the path of movement of the blade into engagement with the blade after the blade has been moved to its closure setting.

2. A valve as claimed in claim 1 and in which the resilient lining is bonded to the rectangular-shaped flow path along spaced apart areas so as to leave nonbonded areas between the resilient material and said housing in the plane of movement of the blade; and gas or liquid pressure supply means coupled to said nonbonded areas to cause the nonbonded areas of resilient material to be expanded in the plane of the blade into engagement with the blade.

3. A valve as claimed in claim 2 and wherein there are recesses in the housing in the plane of motion of the flat blade and facing the two side edges of the flat blade, the expansible resilient material having a portion that extends into said recesses but is not bonded thereto to leave a gap between the expansible resilient material and said recesses, into which gap compressed gas or liquid can be forced to expand the resilient material in the plane of movement of the blade into engagement with the blade when in its closure setting, the resilient material being bonded to the housing along areas on each side of said recesses.

4. A valve as claimed in claim 1 and wherein there is a recess in the housing in the plane of motion of the flat blade, and resilient material in said recess that is expandable into sealing relationship with the blade after it has moved to its closure setting, the resilient material in said recess being formed with a bore such that when compressed gas or liquid is fed into said bore the resilient material is expandable towards the blade.

5. A valve comprising a housing through which a flow path extends and a flat blade movable across said flow path, means for supporting and moving said flat blade, the flat blade being rigid and supported only at one end in said means for moving the same as it moves across the flow path, the flow path having resilient sealing means that can be expanded into contact with the two sides edges of the blade after the blade has been moved to its closure setting, whereby the flat blade is free from any support along its two side edges as it moves across the flow path.